United States Patent
Ingersoll

(10) Patent No.: US 8,646,544 B2
(45) Date of Patent: Feb. 11, 2014

(54) TILLAGE POINT

(75) Inventor: Tiffany L. Ingersoll, Ankeny, IA (US)

(73) Assignee: Deere & Company, Moline, IL (US)

( * ) Notice: Subject to any disclaimer, the term of this patent is extended or adjusted under 35 U.S.C. 154(b) by 331 days.

(21) Appl. No.: 13/045,628

(22) Filed: Mar. 11, 2011

(65) Prior Publication Data

US 2012/0227993 A1    Sep. 13, 2012

(51) Int. Cl.
*A01B 39/20*    (2006.01)

(52) U.S. Cl.
USPC .......................................... 172/730

(58) Field of Classification Search
USPC .......................................... 172/730
See application file for complete search history.

(56) References Cited

U.S. PATENT DOCUMENTS

| | | | |
|---|---|---|---|
| 774,324 A | 11/1904 | Hill et al. | |
| 3,171,500 A | 3/1965 | Dils, Jr. | |
| 4,403,662 A | 9/1983 | Dietrich, Sr. | |
| 5,437,337 A | 8/1995 | Dietrich, Sr. | |
| 5,499,686 A | 3/1996 | Parker | |
| D415,173 S | 10/1999 | Zaun | |
| D429,256 S | 8/2000 | Zaun | |
| D429,257 S | 8/2000 | Zaun | |
| D429,258 S | 8/2000 | Zaun | |
| 6,276,462 B1 | 8/2001 | Dietrich, Sr. | |
| 6,357,368 B1 | 3/2002 | Swab et al. | |
| 6,422,323 B1 | 7/2002 | Dietrich, Sr. | |
| 6,443,237 B1 | 9/2002 | Myers et al. | |
| D505,137 S | 5/2005 | Steinlage et al. | |
| D512,078 S | 11/2005 | Poutre | |
| 7,104,341 B2 | 9/2006 | Steinlage et al. | |
| D615,998 S | 5/2010 | Kovach et al. | |
| 8,176,993 B2 * | 5/2012 | Mcnabb | 172/730 |
| 2008/0257576 A1 * | 10/2008 | McNabb | 172/730 |
| 2010/0326683 A1 | 12/2010 | Kovach et al. | |

* cited by examiner

Primary Examiner — Thomas B Will
Assistant Examiner — Joel F. Mitchell

(57) ABSTRACT

A tillage point (10) includes a body (12) with a flat nose (21) angled from the horizontal approximately 35 degrees, a more shallowly angled intermediate flat portion (22) behind the nose, and aft flat surfaces (28) angled downwardly in the outward direction to connections with rear wings (14). The wings (14) may be angled approximately 16 degrees downwardly in the outward direction and upwardly about 28 degrees in the aft direction to significantly improve soil fracture, vertical force and draft. The wings (14) may be positioned far back on the point body entirely above an increased strength shank mounting area (16). Use of the flat angled surfaces (21, 22, 28) improves soil rupture compared to points with more rounded surfaces. The downwardly angled flat surfaces (28) above and adjacent the wings (14) provide soil parting for improved flow around the shank.

16 Claims, 3 Drawing Sheets

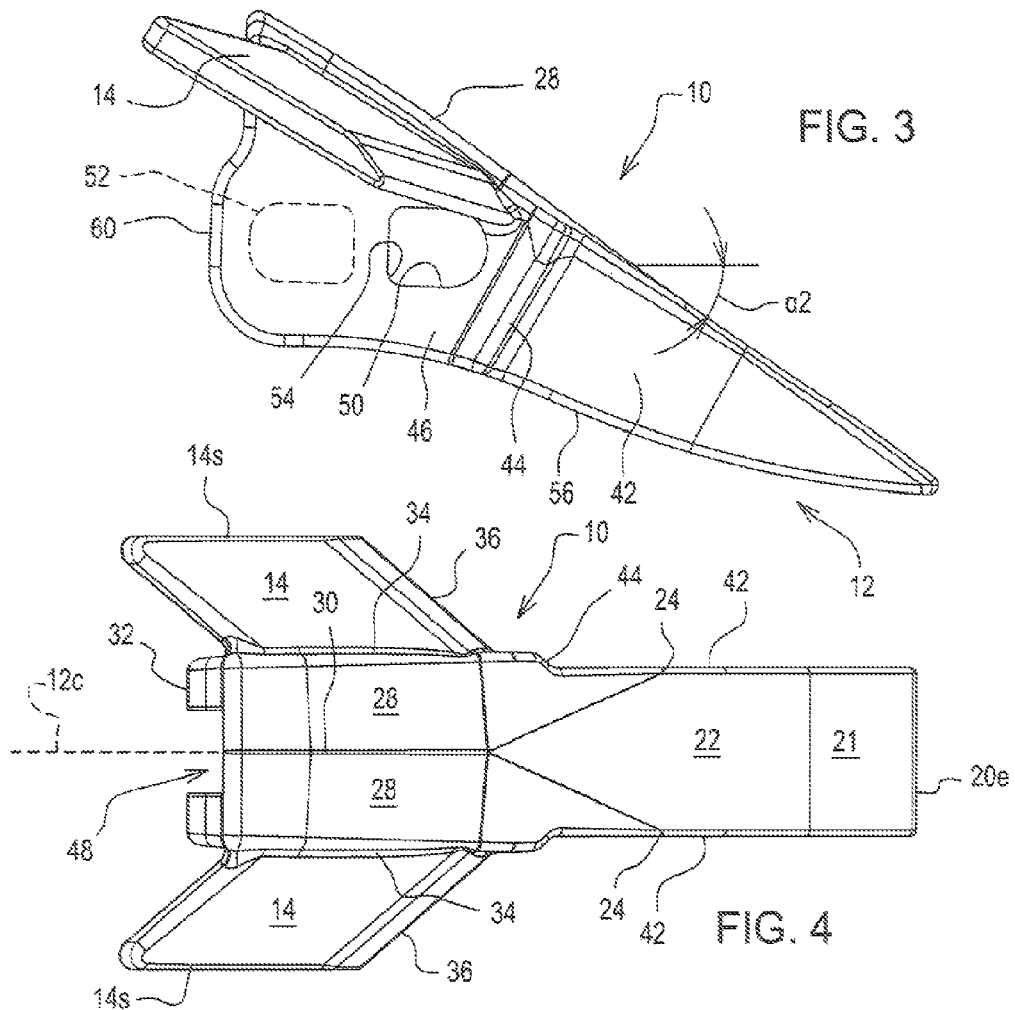
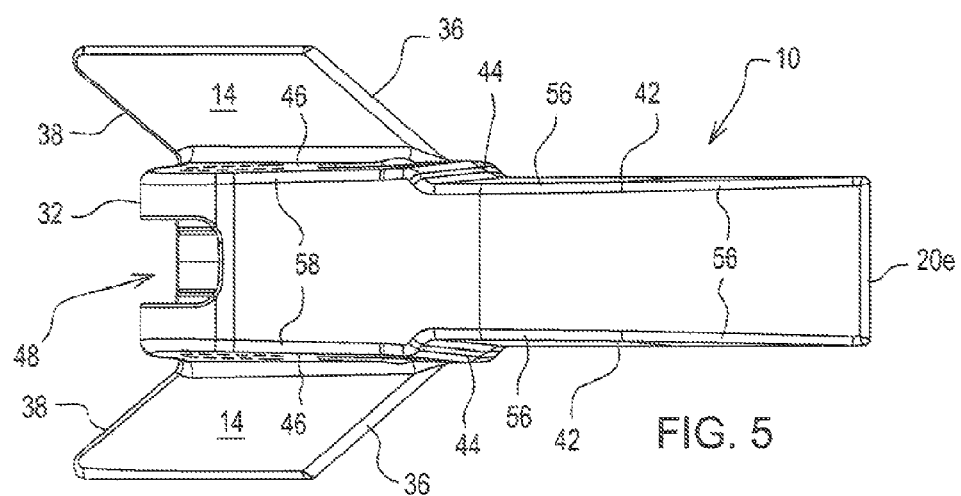

US 8,646,544 B2

TILLAGE POINT

FIELD OF THE INVENTION

The present invention relates generally to a tillage implement and, more specifically, to tillage point structure.

BACKGROUND

Ground engaging components such as tillage points for agricultural tillage applications, particularly primary tillage applications for implements such as deep tillage rippers, vary considerably in wear, breakage, draft and soil fracturing characteristics. A variety of tillage point designs are exemplified by U.S. Pat. Nos. D615,998; D512,078; D505,137; D429,258; D429,257; D429,256; and D415,173. Numerous approaches to tillage point structure are discussed, for example, in U.S. Pat. Nos. 7,104,341; 6,443,237; 6,422,323; 6,357,368; 6,276,462; 5,499,686; 5,437,337; 4,403,662; and 3,171,500. Providing a tillage point that has the acceptable wear and breakage resistance and mounting characteristics while still providing desired draft, soil fracturing and soil flow characteristics continues to be problematic. Areas of the point near the mounting bolt hole location tend to be more prone to breakage. In addition, different standards often have different mounting arrangements so that a point designed for one piece of equipment will not fit on another machine. Maximizing vertical force on the point, minimizing point draft and optimizing soil fracture and rupture require a carefully selected combination of wing location and design, point surface configurations and surface angles.

SUMMARY

A new point design reduces the incidences of breakage at mounting locations, reduces draft and improves soil fracturing and rupture compared to previously available points. The point body includes a flat nose that may be angled from the horizontal approximately 35 degrees, and an intermediate flat portion behind the nose is angled more shallowly. In addition, the top rear portion of the body inwardly adjacent the wings may be angled downwardly in the outward direction towards the wings, which are angled approximately 15 or 16 degrees downwardly in the outward direction. Providing the angle to the top of the rear body portion and angling the wings cooperate to significantly improve soil fracture, increase vertical force for good soil entry and maintenance of ground penetration, and decrease draft. Additionally the wings may be positioned as far back on the point body as possible for improving soil rupture while at the same time decreasing draft when compared with more forward wing locations on many previously available points. Use of flat surfaces improves soil rupture compared to points with more rounded surfaces and provides an overall robust point appearance.

These and other objects, features and advantages of the present invention will become apparent upon reading the following detailed description in view of the drawings.

BRIEF DESCRIPTION OF THE DRAWINGS

FIG. 3 is a right side view of the point of FIG. 1.
FIG. 4 is a left side view of the point of FIG. 1.
FIG. 5 is a bottom view of the point of FIG. 1.

DESCRIPTION

Figure 1:
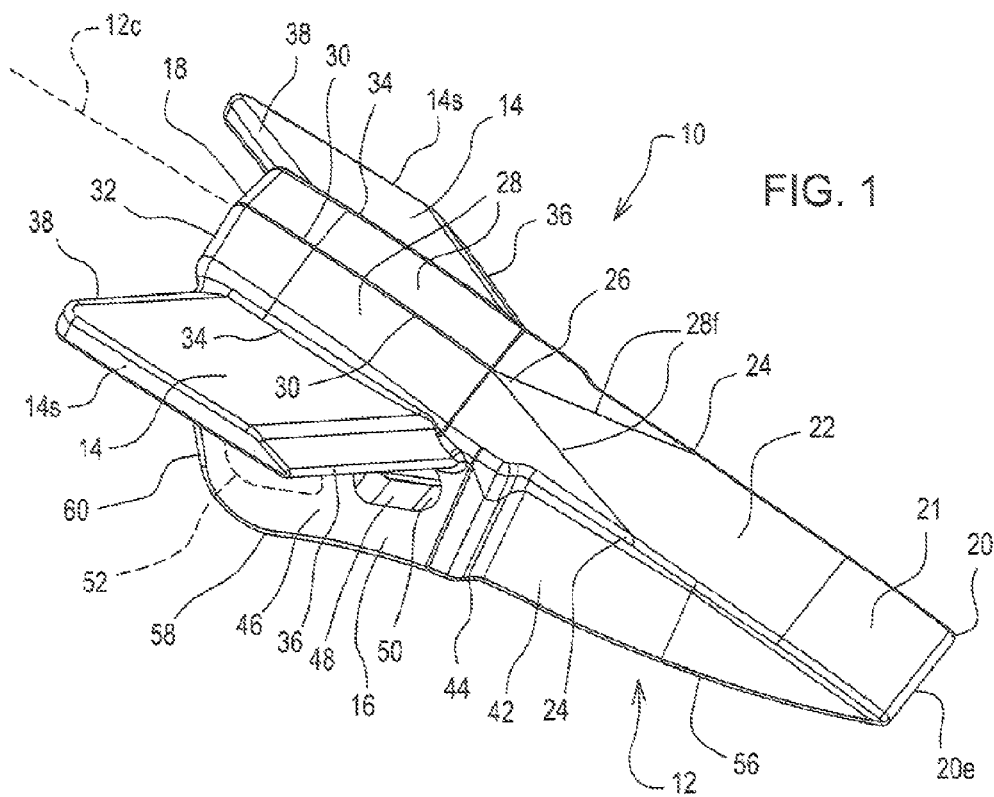
FIG. 1 is perspective view of a tillage point with improved surface and mounting configuration.

Referring to the drawings, an agricultural tillage tool or ripper point 10 includes a main body 12 with a fore-and-aft centerline 12c, aft wings 14 and a lower aft mounting area 16 adapted for attachment to a shank (not shown). A foremost point 20 has a transversely extending leading cutting edge 20e and a flat leading surface 21 angled upwardly and rearwardly from the edge 20e at an angle $\alpha 1$ with respect to a horizontal plane H (FIG. 2) to enter the soil as the point 10 is moved forwardly. A centrally located flat surface 22 is angled at a slightly shallower angle $\alpha 2$ with respect to the horizontal H than the angle of the leading surface 21. The flat surface 22 is planar and extends in a rearward and upward direction from the surface 21 to side locations 24 where the flat surface 22 converges in the rearward direction to a central apex area 26.

Opposed top rear soil parting surfaces 28 have forward extremities lying on lines 28f extending rearwardly and inwardly from the side locations 24 to the central apex area 26. The top surfaces 28 may be generally planar and symmetrical about the centerline 12c at a part line 30 and terminate at an aft end 32 of the body 12. The surfaces 28 may be angled downwardly in the outward direction from the centerline 12c at an angle less than the angle of the top surfaces of the wings 14.

As shown, the wings 14 are connected to the main body 12 at fore-and-aft extending innermost wing connecting locations 34 near the outermost edges of the opposed rear top surfaces 28 behind the apex area 26. Leading cutting edges 36 of the wings 14 are angled rearwardly in the outward direction at an angle of about 40 degrees relative to centerline 12c of the body 12. The wings are connected to the body 12 at the locations 34 alongside the soil parting surfaces 28, and the leading cutting edges 36 of the wings may be located entirely rearwardly of a forwardmost portion of the lower shank mounting area 16. Wing aft edges 38 may be parallel to the corresponding leading cutting edges 36 and project behind the aft end 32 of the body 12. The wing configuration, which positions the wings 14 rearwardly compared to many conventional points, reduces draft and increases soil rupture.

Figure 2:
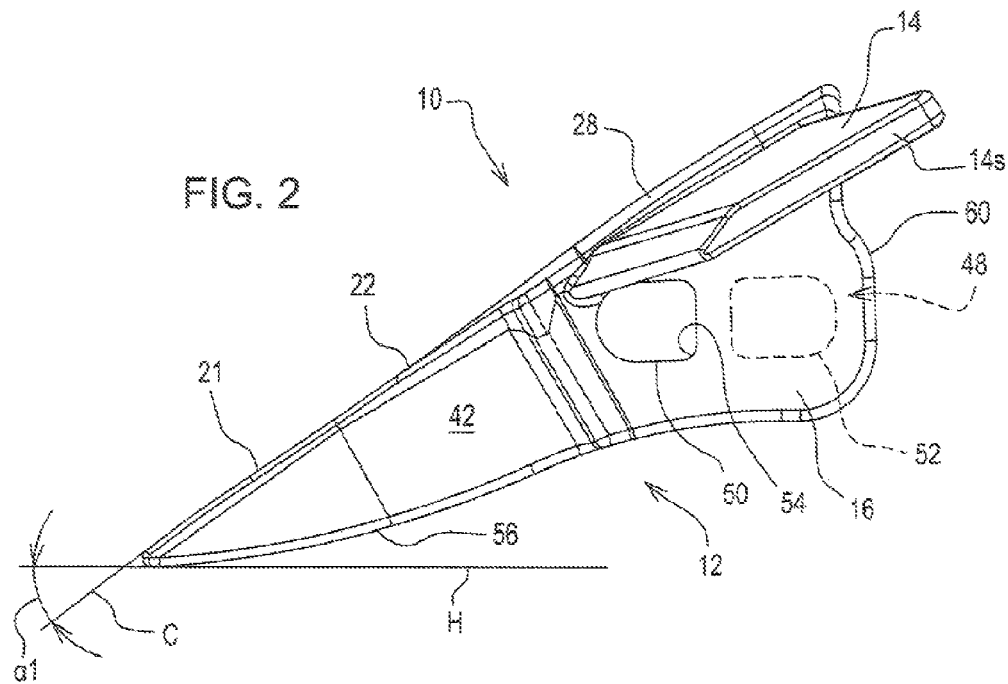
FIG. 2 is a side view of the point of FIG. 1.
Figure 6:
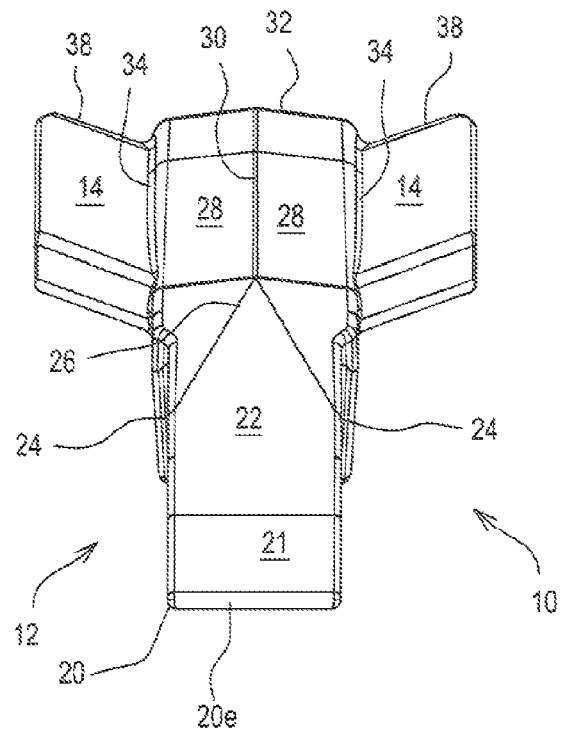
FIG. 6 is a front view of the point of FIG. 1.
Figure 7:
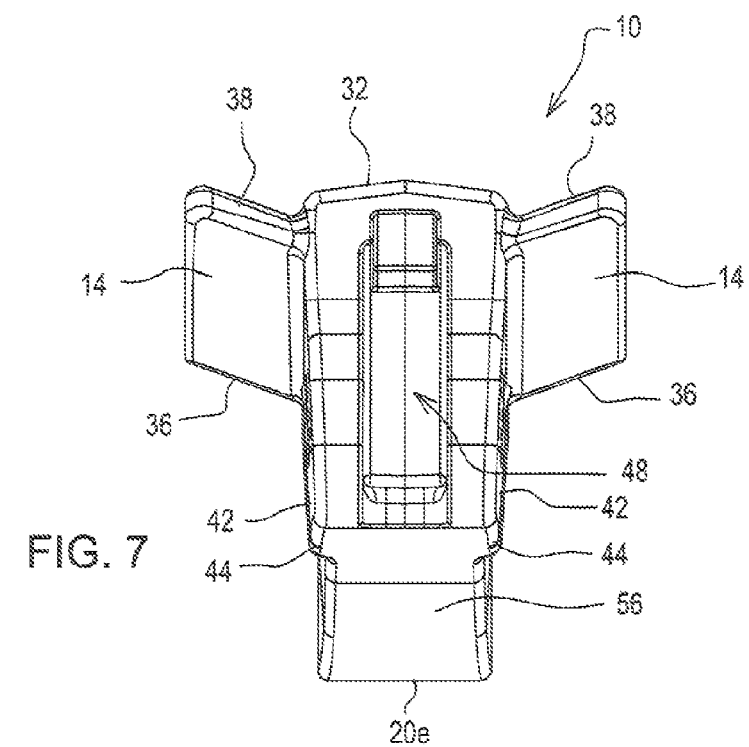
FIG. 7 is a rear view of the point of FIG. 1.

The upper surfaces of the wings 14 may be generally planar and angled downwardly from the horizontal in the outward direction at an angle greater than the angle of the flat surfaces 28. As shown, the wing surface angle is approximately 16 degrees to reduce draft and improve soil rupture. As shown, the downward angle in the outward direction of each of the planar top surfaces of the wings 14 is greater than that of the corresponding surface 28. The top surfaces of the wings 14 may be angled upwardly in the aft direction relative to the horizontal H at an angle slightly less than the shallower surface angle $\alpha 2$ or approximately 28 degrees to minimize draft, increase vertical force and improve soil rupture. The part line 30 may angled relative to H at an angle approximately equal to $\alpha 2$. As seen in FIGS. 2 and 3, the surfaces 28 are raised slightly relative to the top surfaces of the wings 14 to reduce draft. The wings 14 may be of any desired width, including zero width. The opposed top surfaces 28 with the slight downward angles in the outward direction from the centerline 12c, which may be in the range of 5 to 10 degrees and are shown in the drawing figures to be approximately 8 degrees. The angles of the surfaces 28 provide some parting of the soil for better soil flow around the shank 18 and also provide soil rupture and reduces draft, even with narrower or non-existent wings 14.

The main body 12 has generally parallel and upright opposite sides 42 which extend rearwardly from the point 20 to locations 44 rearwardly of the side locations 24 and forwardly of the leading edges 36 of the wings 14. At the locations 44, which may be below and slightly forward of the innermost portions of the leading cutting edges 36 of the wings 14, walls 46 diverge outwardly from the sides 42 and extend rearwardly to the trailing end 40 and define a shank-receiving cavity 48 between the walls 46. The outward divergence facilitates increased thickness walls 46 in the mounting area 16 to reduce the incidence of sweep breaking at the connection to the shank. Depending on the type of shank on which the point 10 will be mounted, apertures 50 or 52 may be provided in the walls 46 to receive mounting structure (not shown) such as bolts. The apertures 50 or 52 include rounded outside edges at 54 with radii on the order of 6 mm. to also help reduce breakages.

As best seen in FIGS. 1 and 2, the body 12 includes lower edges 56 that extend rearwardly from the point structure 20 generally horizontally below the surface 21 and then angle upwardly in the rearward direction under the surface 22 to reduce heeling and reduce point weight. At the diverging locations 44 rear lower edges 58 extend generally horizontally to aft edges 60 of the mounting area 16 to provide a continued strong mounting area on all sides of the apertures 52 which are generally rearwardly of and below the apertures 50. The above-described configuration provides enlarged reinforced areas to accommodate mounting holes or other mounting structure in a number of locations so that the point 10 may be used with a variety of shank designs from different manufacturers. The point 10 may be configured as a single casting made from wear-resistant material, and the configuration also provides easy removal of the casting from the mold.

Having described the preferred embodiment, it will become apparent that various modifications can be made without departing from the scope of the invention as defined in the accompanying claims.

The invention claimed is:

1. A soil engaging agricultural tillage point adapted for forward movement below the surface of the soil, the point comprising a body with a centerline, forwardmost point structure having a flat leading surface forming an angle of approximately 35 degrees with a horizontal plane and having opposite generally parallel fore-and-aft extending edges, the forwardmost point structure have a leading edge extending transversely to the forward direction and defining a lowermost portion of the point, a centrally located flat surface extending rearwardly from an aft end of the flat leading surface and forming an angle of approximately 30 degrees with the horizontal plane, the centrally located flat surface having opposite generally parallel edges respectively forming rearward continuations of the fore-and-aft extending edges of the flat leading surface, the body having a pair of opposite upright sides respectively extending downwardly from the generally parallel edges of each of the flat leading surface and the centrally located flat surface, and a pair of opposed soil-parting surfaces arranged symmetrically relative to, and respectively angled downwardly in opposite outward directions from respective inner abutting edges at the centerline, with the soil parting surfaces being located aft of, and forming a rearward continuation of, the centrally located flat surface.

2. The point as set forth in claim 1, wherein said pair of parting surfaces have respective fore-and-aft extending edges which are generally parallel to each other and spaced outward from said centerline a distance greater than the opposite parallel edges of each of the flat leading surface and centrally located flat surface, and the body having a second pair of opposite upright sides respectively extending downwardly from the fore-and-aft extending edges of the pair of parting surfaces, with the second pair of upright walls being respectively offset outwardly relative to, and having a thickness greater than, the first mentioned pair of upright walls and thereby defining increased strength mounting locations of the body.

3. The point as set forth in claim 2 wherein the increased strength mounting locations have multiple mounting areas adapted for containing bolt holes to accommodate different mounting structures, and with bolt holes being located in at least some of the mounting areas, the bolt holes having outer edges with breakage-reducing radii.

4. The point as set forth in claim 2 further comprising a pair of wings extending outwardly and downwardly from fore-and-aft extending innermost wing connections respectively with upper regions of the second pair of upright sides of the body rearwardly of the centrally located flat surface, wherein the wings respectively include a pair of leading edges located generally behind the centrally located flat surface and include a pair of upper flat surfaces, each upper flat surface being angled downwardly in the outward direction at an acute angle from a respective one of the second pair of upright walls and angled upwardly in the rearward direction at an angle approximately equal to 28 degrees with respect to the horizontal plane.

5. The point as set forth in claim 4 wherein the leading edges are angled rearwardly approximately 40 degrees relative to the centerline.

6. The point as set forth in claim 4 wherein the soil-parting surfaces are flat and are respectively angled downwardly in opposite outward directions from their inner abutting edges at angles of between 5 and 10 degrees.

7. A soil engaging agricultural tillage point adapted for forward movement below the surface of the soil, the point comprising a body with a centerline and including an aft shank mounting area and a forwardmost point structure having a flat leading surface forming an angle of approximately 35 degrees with a horizontal plane, the forwardmost point structure have a leading edge extending transversely to the forward direction and defining a lowermost portion of the point, a centrally located flat surface extending rearwardly from an aft end of the flat leading surface and forming an angle of approximately 30 degrees with the horizontal plane, the centrally located flat surface having generally parallel opposite edges, the body having a pair of opposite upright sides extending downwardly from the generally parallel opposite edges, and a pair of soil parting surfaces disposed symmetrically relative to, and being respectively angled downward in opposite outward directions from, the centerline at locations aft of the centrally located flat surface at an angle of between 5 and 10 degrees.

8. The point as set forth in claim 7 wherein the pair of opposite upright sides have aft ends located forwardly of the shank mounting area, and said body including a second pair of opposite upright sides respectively offset outwardly from and joined to the aft ends of the first-mentioned pair of opposite upright sides and defining the shank mounting area, with the second pair of upright sides having respective thickened walls, relative to the thickness of walls of the first-mentioned pair of opposite upright sides, located below the soil parting surfaces, thereby strengthening the shank mounting area.

9. The point as set forth in claim 8 wherein the thickened walls have a first mounting hole location and a second mounting hole location, the second mounting hole location offset in the fore-and-aft direction from the first mounting hole location.

10. The point as set forth in claim 7 wherein said pair of soil parting surfaces respectively include a pair of outer fore-and-aft extending, parallel soil parting surface edges, said point further including a pair of wings respectively extending oppositely outwardly from the pair of soil parting surface edges, the wings having respective upper surfaces extending downwardly in opposite outward directions and upwardly in the aft direction.

11. The point as set forth in claim 10 wherein the wings respectively extend downwardly in the opposite outward directions at equal angles which are greater than the angle of the centrally located flat surface makes relative to the horizontal plane.

12. The point as set forth in claim 10 wherein the wings extend upwardly in the aft direction at an angle less than 30 degrees from the horizontal plane and respectively extend downwardly in the opposite outward directions at an angle of approximately 16 degrees from said pair of soil parting surface edges to reduce draft and help improve soil rupture.

13. The point as set forth in claim 12 wherein the pair of soil parting surfaces are flat and are angled downwardly in the opposite outward directions at approximately 8 degrees from a centrally located part line.

14. The point as set forth in claim 13 wherein the wings have forwardmost edges angled rearwardly relative to the centerline at an angle of approximately 40 degrees.

15. The point as set forth in claim 13 wherein the pair of wings are respectively connected to the body at a pair of fore-and-aft extending wing connection locations alongside the soil parting flat surfaces and the pair of wings having respective leading cutting edges located entirely rearwardly of a forwardmost portion of the shank mounting area.

16. The point as set forth in claim 14 wherein the pair of opposite soil parting surfaces are connected to the centrally located flat surface along lines extending diagonally from the opposite parallel edges of the parting surfaces and converging to a central apex area having an aft end located on said centerline and approximately on a line extending between forwardmost portions of the forwardmost edges of the wings.

* * * * *